US 7,631,490 B2

(12) United States Patent
Colignon

(10) Patent No.: US 7,631,490 B2
(45) Date of Patent: Dec. 15, 2009

(54) SYSTEM FOR ASSISTING REGENERATION OF POLLUTION MANAGEMENT MEANS

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 280 days.

(21) Appl. No.: 11/571,253

(22) PCT Filed: Jun. 20, 2005

(86) PCT No.: PCT/FR2005/050461

§ 371 (c)(1),
(2), (4) Date: Dec. 22, 2006

(87) PCT Pub. No.: WO2006/005864

PCT Pub. Date: Jan. 19, 2006

(65) Prior Publication Data
US 2008/0041039 A1 Feb. 21, 2008

(30) Foreign Application Priority Data
Jun. 23, 2004 (FR) .................................. 04 06855

(51) Int. Cl.
*F01N 3/025* (2006.01)
(52) U.S. Cl. .......................................... 60/286; 60/295
(58) Field of Classification Search ................. 60/286, 60/295, 297, 303, 285
See application file for complete search history.

(56) References Cited
U.S. PATENT DOCUMENTS 6,182,443 B1 * 2/2001 Jarvis et al. .................... 60/274
6,594,989 B1    7/2003 Hepburn et al.
6,901,751 B2 * 6/2005 Bunting et al. ................. 60/297
7,134,275 B2 * 11/2006 Tsutsumoto et al. ........... 60/295
7,181,909 B2 * 2/2007 Sato et al. ...................... 60/297
2002/0112472 A1 * 8/2002 Tashiro et al. ................. 60/295
2002/0196153 A1 * 12/2002 Kinugawa et al. ............ 340/606
2003/0033800 A1 * 2/2003 Tonetti et al. ................. 60/286
2004/0035101 A1 * 2/2004 Imai et al. ..................... 60/295

FOREIGN PATENT DOCUMENTS

| EP | 1134397 A | 9/2001 |
|----|-----------|--------|
| EP | 1281852 A | 2/2003 |
| FR | 2820462 A | 8/2002 |
| FR | 2829798 A | 3/2003 |
| JP | 62159713 A | 7/1987 |
| JP | 63120812 A | 5/1988 |

* cited by examiner

Primary Examiner—Jonathan Matthias
(74) Attorney, Agent, or Firm—Nicolas E. Seckel

(57) ABSTRACT

The invention concerns a system for assisting regeneration of pollution management means (1) integrated in an exhaust line (3) of a diesel engine (4), wherein the engine (4) is associated with common ramp means (7) injecting fuel into the cylinders thereof, based on at least one post-injection and adapted to implement, in isocouple, through modification of the engine operation control parameters, at least two strategies called level 1 and level 2 and a second regeneration strategy including level 1 strategies and a sequence alternating level 2 and over-calibrated level 2 strategies, enabling different thermal levels to be achieved in the exhaust line. The invention is characterized in that it comprises means (8) for analyzing the vehicle running conditions and means (8) for comparing same to threshold values, to implement the first regeneration strategy for running conditions higher than the threshold values or the second regeneration strategy for running conditions lower than the threshold values.

20 Claims, 2 Drawing Sheets

SYSTEM FOR ASSISTING REGENERATION OF POLLUTION MANAGEMENT MEANS

BACKGROUND ART

The present invention concerns a system for assisting the regeneration of depollution means integrated in an exhaust line of a motor vehicle diesel engine.

More particularly, the invention concerns such a system in which the engine is associated to common rail means for the supply of fuel to its cylinders, according to at least one post-injection.

Such a post-injection is, in a standard manner, an injection of fuel after the high dead center of the cylinder under consideration.

These supply means are adapted to implement, in iso-couple, through modification of parameters for controlling the operation of the engine, different regeneration strategies that make it possible to obtain different thermal states in the exhaust line.

Thus, for example, supply means implementing a first regeneration strategy according to a strategy called level 1 strategy and a second regeneration strategy according to a strategy called level 2 strategy and/or an over-calibrated level 2 strategy, have already been proposed.

Indeed, it is known that, to ensure the regeneration of depollution means such as a particle filter, the soot trapped therein is burned thanks to the thermal energy provided by the engine and to the exotherm obtained by the conversion of the HC and of the CO on means forming an oxidation catalyst placed, for example, upstream of the particle filter.

This combustion can be assisted by a catalyzing element mixed with the soot, coming, for example, from a regeneration assistance additive, mixed with the fuel for the supply of the engine, or by a catalyst deposited directly on the walls of the particle filter (catalyzed particle filter).

The higher the thermal levels in the exhaust line at the inlet of the particle filter, the shorter the duration of the filter regeneration.

SUMMARY OF THE INVENTION

However, in critical driving conditions, such as, for example, city driving or in traffic jams, the levels reached with standard regeneration strategies of the particle filter can become insufficient to ensure a correct regeneration of the filter, which can translate into regenerations that last very long and are thus highly fuel-consuming, or even incomplete.

Any strategy for the elevation of the thermal levels during those critical driving conditions makes it thus possible to ensure complete regenerations, to reduce the over-consumption caused by this regeneration of the particle filter, and above all, to increase the security margin with respect to the cracking or the breakage of these filters.

The objective of the present invention is to propose such a strategy.

To this effect, an object of the invention is a system for assisting the regeneration of depollution means integrated in an exhaust line of a motor vehicle diesel engine, in which the engine is associated with common rail supply means for the injection of fuel into the cylinders thereof, according to at least one post-injection, and adapted to implement, at iso-torque, through modification of parameters for controlling the operation of the engine, at least two regeneration strategies, among which a first regeneration strategy comprising strategies called level 1 strategies and level 2 strategies, and a second regeneration strategy comprising level 1 strategies and a sequence alternating level 2 strategies and over-calibrated level 2 strategies, making it possible to obtain different thermal levels in the exhaust line, characterized in that it comprises means for analyzing the driving conditions of the vehicle and means for comparison thereof with predetermined threshold values, to implement the first regeneration strategy for driving conditions above the threshold values or the second strategy for driving conditions below the threshold values.

According to other characteristics:
the depollution means comprise a particle filter;
the particle filter is catalyzed;
the depollution means comprise an NOx trap;
the fuel comprises an additive intended to be deposited, with the particles with which it is mixed, on the depollution means to facilitate their regeneration;
the fuel comprises an additive forming NOx trap,
the depollution means are impregnated with an SCR formulation, ensuring a CO/HC oxidation function;
the engine is associated with a turbo-compressor;
the driving conditions are determined from:
the engine load,
the engine speed,
the speed of the vehicle, and/or
the thermal level in the exhaust line of the vehicle.

BRIEF DESCRIPTION OF THE DRAWINGS

The invention will be better understood by reading the following description given as an example only and made in reference to the annexed drawings, in which.

DETAILED DESCRIPTION OF PARTICULAR EMBODIMENTS

Figure 1:
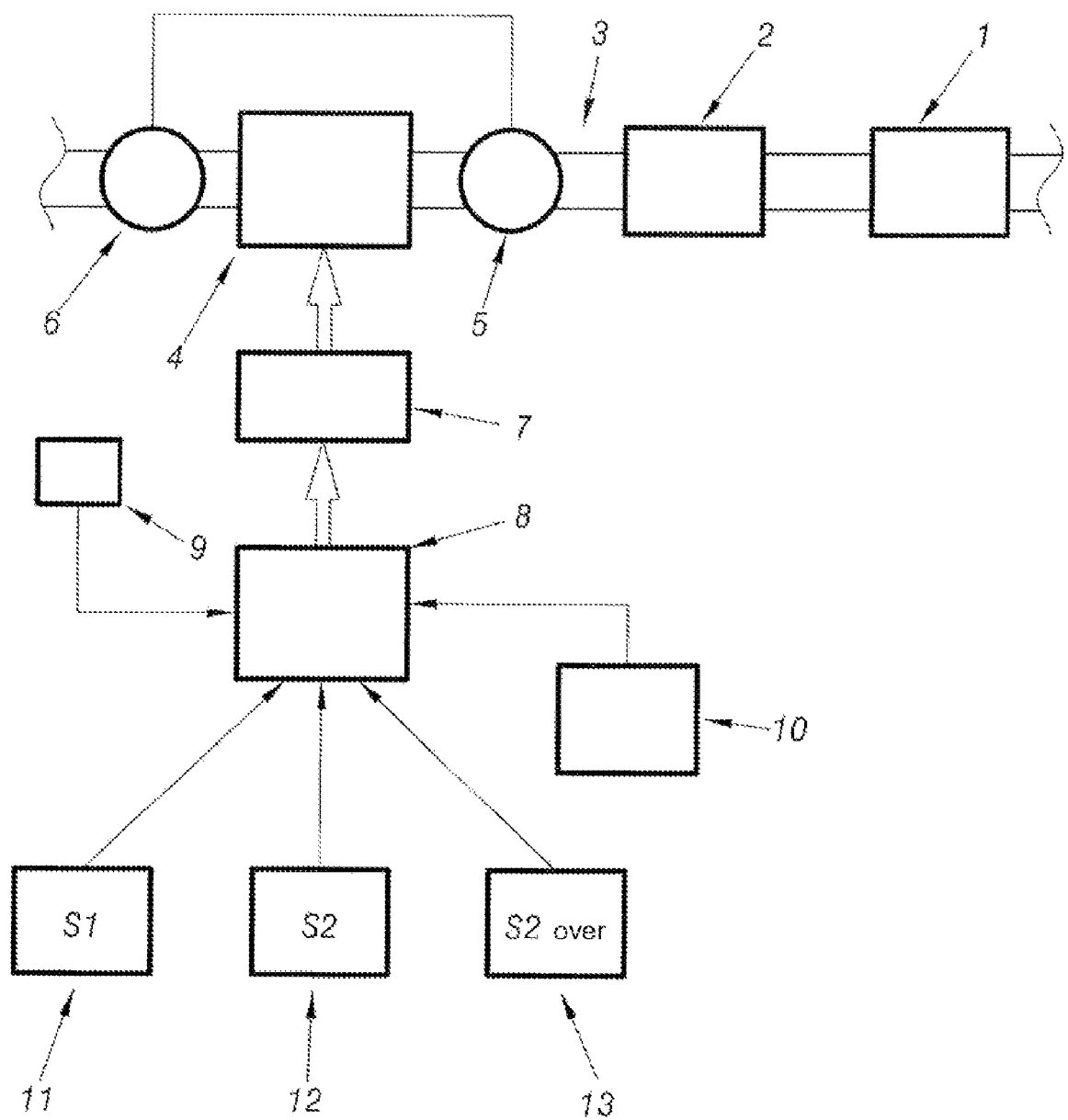
FIG. 1 is a synoptic schematic view illustrating the structure of an assistance system according to the invention.

Indeed, FIG. 1 shows a system for assisting the regeneration of depollution means designated by the general reference 1, associated with means forming oxidation catalyst, designated by the general reference 2 and placed in an exhaust line 3 of a thermal engine such as a motor vehicle diesel engine.

This engine is designated by the general reference 4 and can be associated, for example, with a turbo-compressor whose turbine portion 5 is associated with the exhaust line and whose compressor portion 6 is placed upstream of the engine.

The engine is associated with common rail means for the supply of fuel to the cylinders thereof, designated by the general reference 7, whose operation is controlled by a supervisor 8.

According to the invention, this system also comprises means for analyzing the driving conditions of the vehicle and means for comparing these driving conditions with predetermined threshold values, to control the operation of the engine.

The analysis means formed, for example, by the supervisor 8, are then connected to means for acquiring these driving conditions, designated by the general reference 9, supplying those to the supervisor 8, so as to enable the latter to compare them to threshold values such as supplied by generation means 10 comprising any appropriate means making it possible to establish these threshold values.

These driving conditions can be, for example, determined from the engine load, the engine speed, the speed of the vehicle and/or the thermal level in the exhaust line of this vehicle.

In fact, the supervisor and the common rail means for the fuel supply are adapted to drive the engine according to different regeneration strategies which make it possible to obtain different thermal levels in the exhaust line, and in particular, a first regeneration strategy comprising level 1 strategies, S1, as designated by the general reference 11 on this FIG. 1, and level 2 strategies, S2, as designated by the reference 12 on this Figure, and a second regeneration strategy comprising level 1 strategies, S1, and a sequence alternating level 2 strategies, S2, and over-calibrated level 2 strategies, S2 over, as designated by the general reference 13 on this Figure.

In fact, in the system according to the invention, and as a function of the results of the comparison performed by the means for comparing the driving conditions of the vehicle to predetermined threshold values, a regeneration strategy is implemented according to a level 1 and level 2 operation mode for driving conditions above the predetermined threshold values, and according to a level 1 operation mode associated with a sequence alternating level 2 and over-calibrated level 2 operation modes, for driving conditions below the predetermined threshold levels.

This makes it thus possible to maximize the chances of success of the regeneration, in particular in critical driving conditions, such as, for example, city driving or in traffic jams.

By way of example, one can go from the following criteria for a standard level 2 calibration for assisting the regeneration of a particle filter:
  maximal exhaust collector temperature=800° C.
  maximal catalyst exotherm=150° C.
  maximal catalyst outlet temperature=710° C.
  maximal catalyst internal temperature=760° C.
  minimal oxygen content of the gases at catalyst outlet=3%
to the following criteria for an over-calibrated level 2 strategy:
  maximal exhaust collector temperature=830° C.
  maximal catalyst exotherm=200° C.
  maximal catalyst outlet temperature=730° C.
  maximal catalyst internal temperature=no maximal value
  minimal oxygen content of the gases at catalyst outlet=2%
With the following results:

| | |
|---|---|
| EUDC cycles | temperature at PF inlet of 600° C. reached in 200 sec. instead of 600 sec. with standard RG |
| | temperature at PF inlet of 650° C. reached in 220 sec. whereas this temperature is never reached with standard RG |
| City cycle | temperature at PF inlet of 500° C. reached in 100 sec. instead of 150 sec. with standard RG |
| | temperature at PF inlet of 550° C. reached in 105 sec. instead of 300 sec. with standard RG |
| | temperature at PF inlet of 600° C. reached in 150 sec. whereas this temperature is never reached with standard RG |

Figure 2:
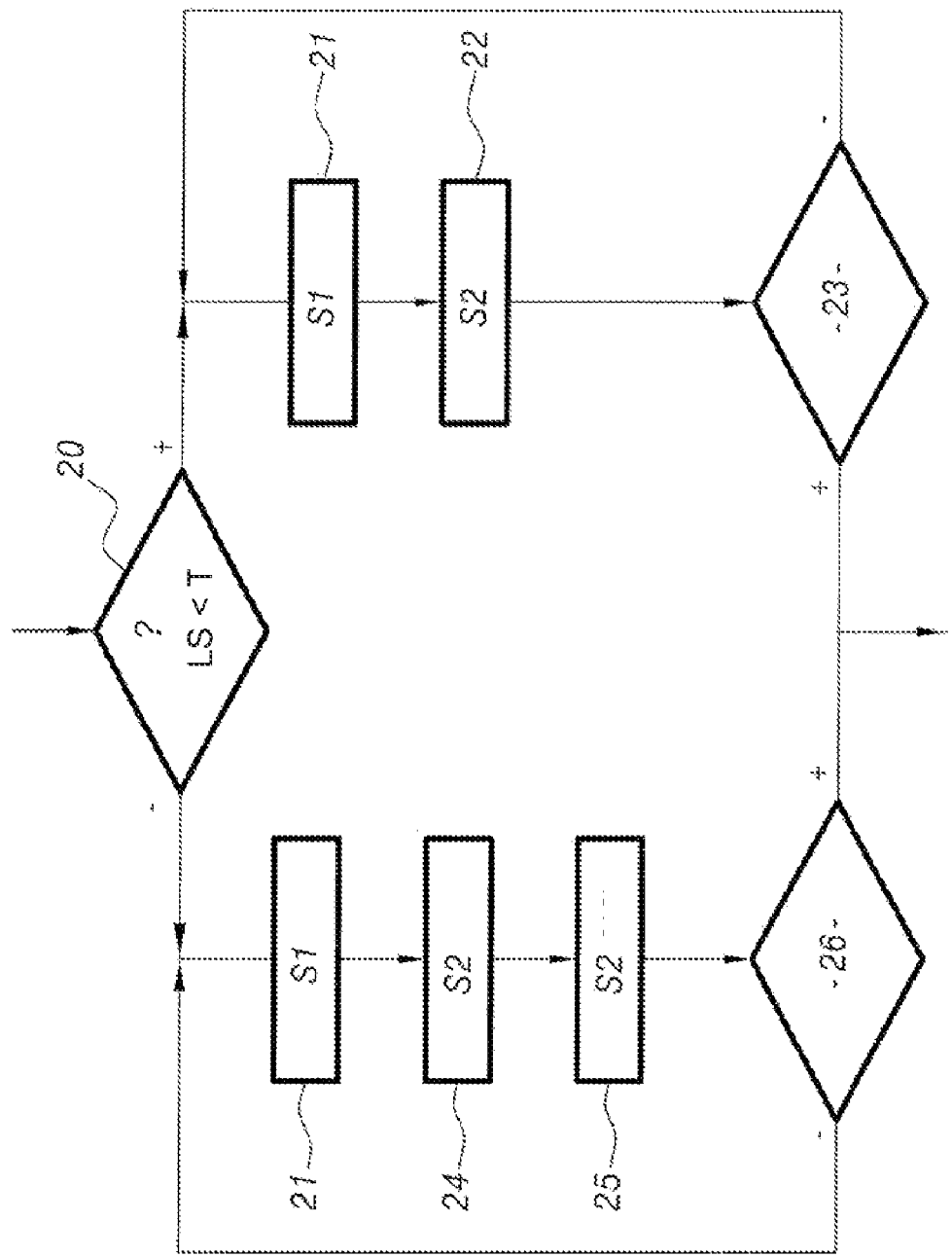
FIG. 2 illustrates the operation thereof.

FIG. 2 shows a flow chart illustrating the operation of this regeneration assistance system.

This operation begins with a phase of acquisition of the driving conditions of the vehicle from the different items of information mentioned above, i.e., for example, from the engine load, the engine speed, the speed of the vehicle, and/or the thermal level in the exhaust line of the vehicle, in a standard manner.

These driving conditions are subsequently compared by the supervisor, at 20, to threshold values.

If the driving conditions are above the threshold values, the regeneration strategy implements a level 1 strategy, at 21, associated with a strategy called level 2 strategy, at 22, until the end of the regeneration as determined at 23.

Conversely, if the driving conditions are below the threshold values, the supervisor implements a second regeneration strategy comprising a level 1 strategy, at 21, associated with a sequence alternating level 2 strategies and over-calibrated level 2 strategies, such as those designated by 24 and 25 on this Figure, until the end of the regeneration as detected at 26.

It is of course self-evident that different embodiments of this system can be envisioned, and that the depollution means can comprise a particle filter, such as, for example, a catalyzed particle filter or an NOx trap.

In addition, the fuel can also comprise an additive intended to be deposited, with the particle with which it is mixed, on the depollution means to facilitate their regeneration.

These depollution means can also be impregnated with an SCR formulation ensuring a CO/HC oxidation function in a standard manner.

Other means forming oxidation catalyst can be envisioned, and the depollution means and the means forming oxidation catalyst can be integrated into a single and same element, in particular on the same substrate.

By way of example, a particle filter integrating the oxidation function can be envisioned.

Similarly, an NOx trap integrating such an oxidation function can also be envisioned, whether it is additivized or not.

This oxidation and/or NOx trap function can be implemented, for example, by an additive mixed with the fuel.

I claim:

1. System for assisting the regeneration of depollution means integrated in an exhaust line of a motor vehicle diesel engine, in which the engine is associated with common rail supply means for the injection of fuel into the cylinders thereof, according to at least one post-injection, and adapted to implement, at isotorque, through modification of parameters for controlling the operation of the engine, at least two regeneration strategies, among which a first regeneration strategy comprising strategies called level 1 strategies and level 2 strategies, and a second regeneration strategy comprising level 1 strategies and a sequence alternating level 2 strategies and over-calibrated level 2 strategies, wherein the level 2 strategy is calibrated according to the following criteria:
    maximal exhaust collector temperature=800° C.
    maximal catalyst exotherm=150° C.
    maximal catalyst outlet temperature=710° C.
    maximal catalyst internal temperature=760° C.
    minimal oxygen content of the gases at catalyst outlet=3%
  and the over-calibrated level 2 strategy is calibrated according to the following criteria:
    maximal exhaust collector temperature=830° C.
    maximal catalyst exotherm=200° C.
    maximal catalyst outlet temperature=730° C.
    maximal catalyst internal temperature=no maximal value
    minimal oxygen content of the gases at catalyst outlet=2%
  making it possible to obtain different thermal levels in the exhaust line,
  wherein said system comprises means for analyzing the driving conditions of the vehicle and means for comparing these driving conditions with predetermined threshold values, to implement the first regeneration strategy for driving conditions above the threshold values or the second strategy for driving conditions under the threshold values, so as to improve the chances of success of the regeneration in critical driving conditions while increasing a security margin with respect to cracking or breakage of the depollution means.

2. System according to claim 1, wherein the depollution means comprise a particle filter.

3. System according to claim 2, wherein the particle filter is catalyzed.

4. System according to claim 1, wherein the depollution means comprise an NOx trap.

5. System according to claim 1, wherein the fuel comprises an additive intended to be deposited, with the particles with which it is mixed, on the depollution means to facilitate their regeneration.

6. System according to claim 1, wherein the fuel comprises an additive forming NOx trap.

7. System according to claim 1, wherein the depollution means are impregnated with an SCR formulation, ensuring a CO/HC oxidation function.

8. System according to claim 1, wherein the engine is associated with a turbo-compressor.

9. System according to claim 1, wherein the driving conditions are determined from at least one of:
 the engine load,
 the engine speed,
 the speed of the vehicle, and
 the thermal level in the exhaust line of the vehicle.

10. System according to claim 1, wherein the driving conditions are determined from:
 the engine load,
 the engine speed,
 the speed of the vehicle, and
 the thermal level in the exhaust line of the vehicle.

11. Method according to claim 1, wherein the engine is associated with a turbo-compressor.

12. Method of assisting the regeneration of depollution means integrated in an exhaust line of a motor vehicle diesel engine, in which the engine is associated with common rail supply means for the injection of fuel into the cylinders thereof, according to at least one post-injection, and adapted to implement, at isotorque, through modification of parameters for controlling the operation of the engine, at least two regeneration strategies, among which a first regeneration strategy comprising strategies called level 1 strategies and level 2 strategies, and a second regeneration strategy comprising level 1 strategies and a sequence alternating level 2 strategies and over-calibrated level 2 strategies,
 wherein the level 2 strategy is calibrated according to the following criteria:
  maximal exhaust collector temperature=800° C.
  maximal catalyst exotherm=150° C.
  maximal catalyst outlet temperature=710° C.
  maximal catalyst internal temperature=760° C.
  minimal oxygen content of the gases at catalyst outlet=3%
 and the over-calibrated level 2 strategy is calibrated according to the following criteria:
  maximal exhaust collector temperature=830° C.
  maximal catalyst exotherm=200° C.
  maximal catalyst outlet temperature=730° C.
  maximal catalyst internal temperature=no maximal value
  minimal oxygen content of the gases at catalyst outlet=2%
 making it possible to obtain different thermal levels in the exhaust line,
 wherein said method comprises
 analyzing the driving conditions of the vehicle and
 comparing these driving conditions with predetermined threshold values,
 implementing the first regeneration strategy for driving conditions above the threshold values, and
 implementing the second strategy for driving conditions under the threshold values,
 so as to improve the chances of success of the regeneration in critical driving conditions while increasing a security margin with respect to cracking or breakage of the depollution means.

13. Method according to claim 12, wherein the depollution means comprise a particle filter.

14. Method according to claim 13, wherein the particle filter is catalyzed.

15. Method according to claim 12, wherein the depollution means comprise an NOx trap.

16. Method according to claim 12, wherein the fuel comprises an additive intended to be deposited, with the particles with which it is mixed, on the depollution means to facilitate their regeneration.

17. Method according to claim 12, wherein the fuel comprises an additive forming NOx trap.

18. Method according to claim 12, wherein the depollution means are impregnated with an SCR formulation, ensuring a CO/HC oxidation function.

19. Method according to claim 12, wherein the driving conditions are determined from at least one of:
 the engine load,
 the engine speed,
 the speed of the vehicle, and
 the thermal level in the exhaust line of the vehicle.

20. Method according to claim 12, wherein the driving conditions are determined from:
 the engine load,
 the engine speed,
 the speed of the vehicle, and
 the thermal level in the exhaust line of the vehicle.

* * * * *